July 16, 1968 L. P. MEYER 3,392,548
CONSTANT VELOCITY UNIVERSAL JOINTS
Filed June 10, 1966 3 Sheets-Sheet 1
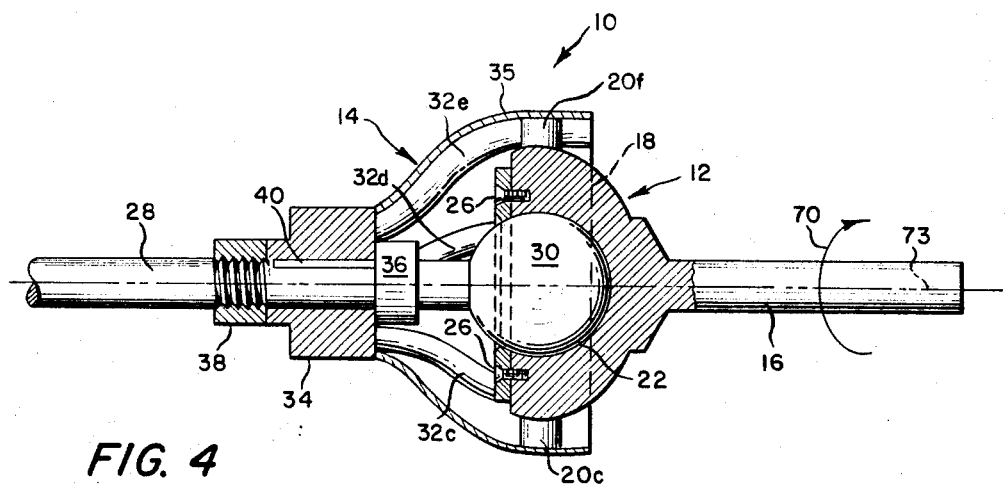
FIG. 4
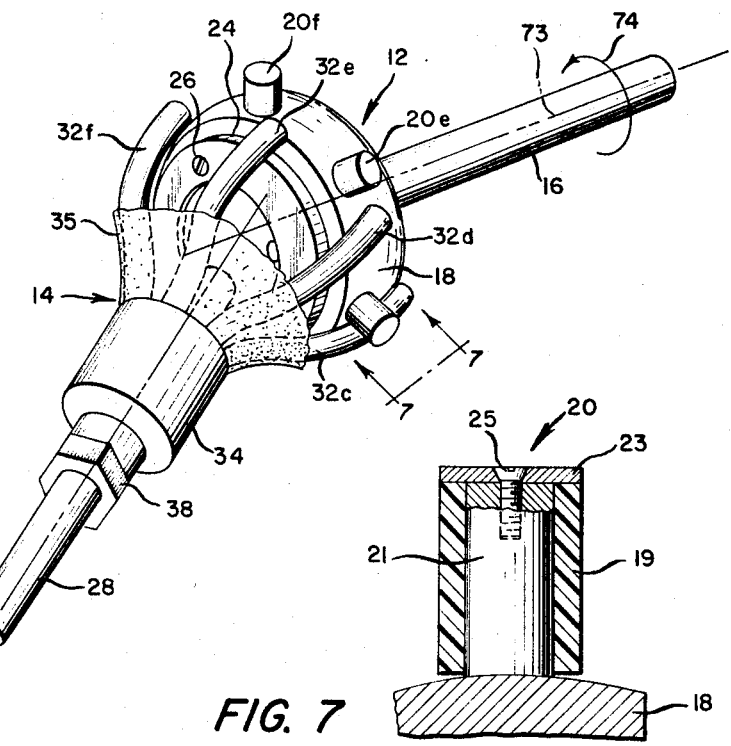
FIG. 1
FIG. 7
INVENTOR
LESTER P. MEYER
BY *Finnegan & Henderson*
ATTORNEYS July 16, 1968 L. P. MEYER 3,392,548
CONSTANT VELOCITY UNIVERSAL JOINTS
Filed June 10, 1966 3 Sheets-Sheet 2
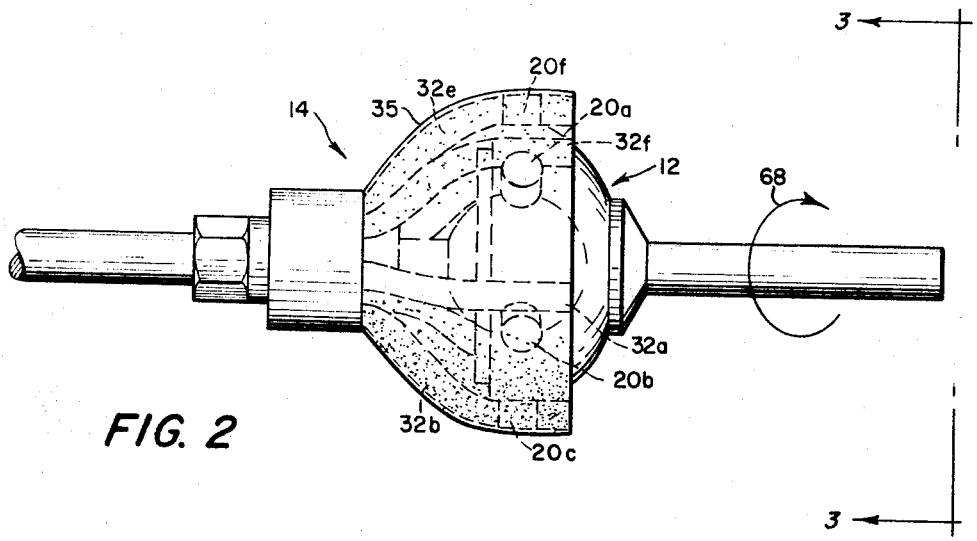
FIG. 2
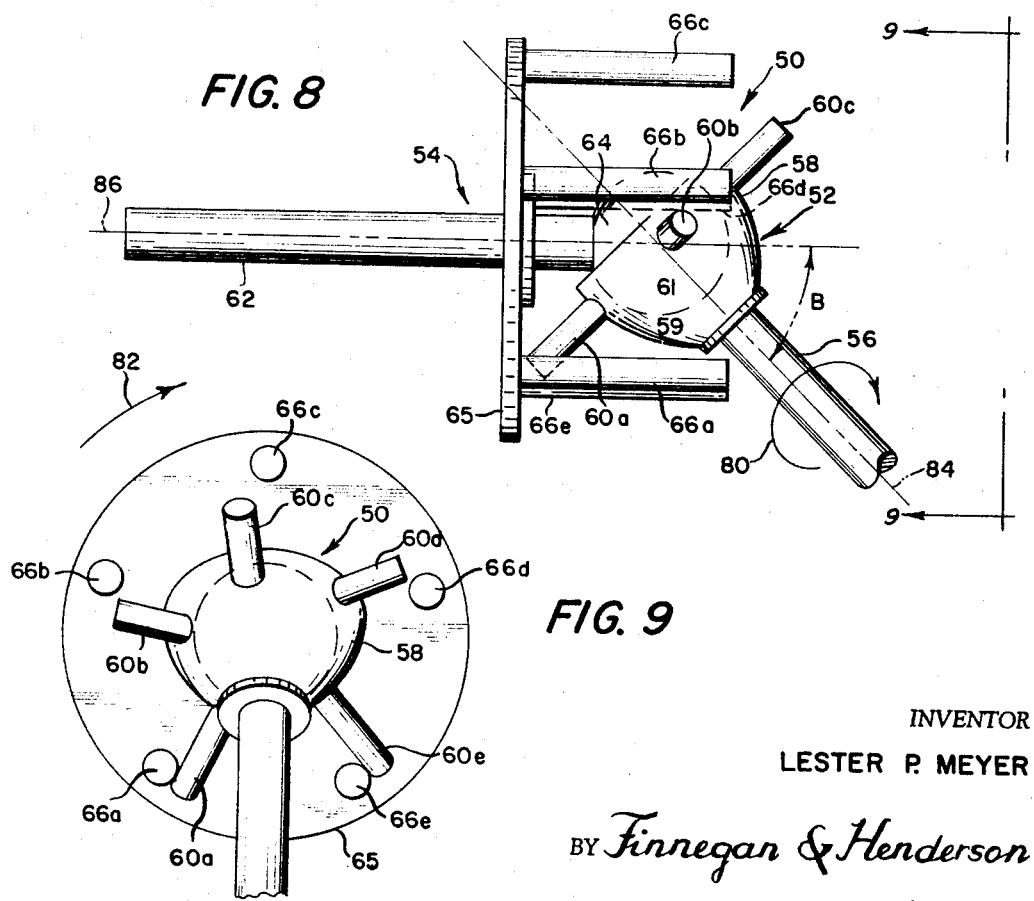
FIG. 8
FIG. 9
INVENTOR
LESTER P. MEYER
BY *Finnegan & Henderson*
ATTORNEYS July 16, 1968     L. P. MEYER     3,392,548

CONSTANT VELOCITY UNIVERSAL JOINTS

Filed June 10, 1966     3 Sheets-Sheet 3

INVENTOR
LESTER P. MEYER

BY *Finnegan & Henderson*

ATTORNEYS

United States Patent Office 3,392,548
Patented July 16, 1968

3,392,548
CONSTANT VELOCITY UNIVERSAL JOINTS
Lester P. Meyer, Glenwood, Minn., assignor, by direct and mesne assignments, to Design Industries, Inc., a corporation of Minnesota
Filed June 10, 1966, Ser. No. 556,724
15 Claims. (Cl. 64—7)

ABSTRACT OF THE DISCLOSURE

A universal joint is provided having a ball and socket connection between two (2) shafts with the socket connected to one shaft and the ball connected to the other shaft. The socket has radially extending contact members which are perpendicular to the shaft connected to the socket, and the shaft connected to the ball has a plurality of second contact members mounted thereon with one of the second contact members extending between each pair of adjacent first contact members when the two (2) shafts are colinear.

---

This invention relates to constant velocity universal joints and more particularly to a universal joint which will transmit rotary motion at a constant rate between two shafts which may be pivoted with respect to each other in any direction from a colinear position.

The universal joints of this invention allow power transmission at angles heretofore unobtainable, and allow the direction of transmission of power to be changed without the undesirable jerking or clattering which accompanies such change of direction in prior art devices.

With even the best prior art universal joints, maximum usable power transmission angles of only about 22° can be achieved. Even though it has occasionally been claimed that certain prior art devices could be used at power transmission angles greater than 22°, in actual practice the use of these joints at angles greater than about 22° produces much undesirable jerking and clattering, and the joints no longer deliver a constant velocity output.

The smooth transmission of power at various angles and the elimination of jerking and clattering in angular power transmission is a most important improvement achieved by the universal joint of the present invention.

Accordingly, it is a primary object of this invention to provide an improved constant velocity universal joint.

It is a further object of this invention to provide an improved universal joint which transmits rotary motion at a constant velocity between two shafts which may be pivoted with respect to each other in any direction from a colinear position.

A further object of this invention is to provide an improved constant velocity universal joint which will transmit rotary motion at a constant rate at angles greater than 22°.

A still further object of this invention is to provide an improved constant velocity universal joint which will permit the transmission of power at angles greater than about 22° without jerking and clattering.

A still further object of this invention is to provide an improved constant velocity universal joint which allows the direction of transmission of power to be changed in operation without jerking or clattering at angles greater than 22°.

Additional objects and advantages of this invention will be set forth in part in the description that follows and in part will be obvious from that description, or may be learned by the practice of the invention, the objects and advantages being realized and attained by means of the instrumentalities, and combinations particularly pointed out in the appended claims.

To achieve its objects, and in accordance with its purpose, this invention provides means which as embodied and broadly described, comprises: a first shaft; a socket secured to one end of said first shaft; at least five equally spaced first contact members extending from said socket; a second shaft; a ball mounted in said socket and secured to one end of said second shaft; said socket including means for retaining said ball within said socket; a plurality of equally spaced second contact members equal in number to said first contact members, mounted on said second shaft with one of said contact members extending between each pair of adjacent first contact members, when said first and second shafts are colinear; and said first and said second shafts being free to pivot with respect to each other in any direction from a colinear position.

It is preferred that said first and said second contact members be in the form of slender cylindrical members. Preferably the first contact members are pins which project radially from said socket and are perpendicular to said first shaft. The second contact members may be straight fingers mounted on a disc which is secured to the second shaft with the fingers extending parallel to the second shaft. Alternatively, the second contact members may be curved fingers which extend in a direction away from said ball and socket and then project between the first contact members. The fingers are preferably tapered having their largest cross-sectional area near their centers.

In accordance with a preferred embodiment of the invention, the first contact members have bearing members on their outer surfaces which can rotate with respect to the remainder of the member when the first contact members are slidably engaged with said second contact members.

The invention consists in the novel parts, construction, arrangement, combinations, and improvements shown and described.

The accompanying drawings, which are incorporated in and constitute a part of this specification, illustrate certain specific embodiments of the invention, and together with the description, serve to explain the principles of the invention.

In the drawings:

FIG. 1 is a perspective view of one embodiment of this invention.

FIG. 2 is a side elevation of the embodiment illustrated in FIG. 1.

FIG. 4 is a side elevation, partially in section, taken along line 4—4 of FIG. 3.

FIG. 7 is an enlarged sectional view taken along line 7—7 of one of the pins in FIG. 1.

FIG. 8 is a side elevation of a second embodiment of this invention.

FIG. 9 is an end elevation taken along line 9—9 of FIG. 8.

Figure 3:
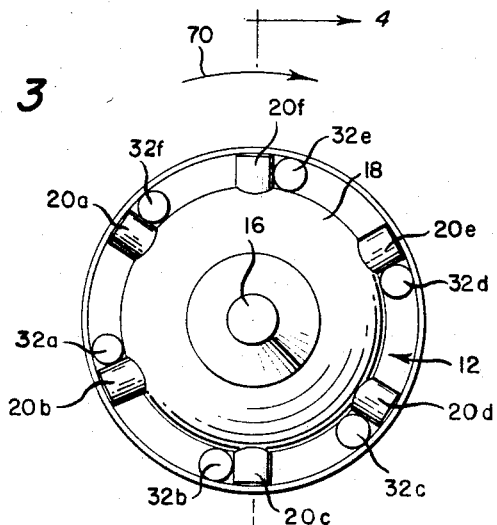
FIG. 3 is an end elevation taken along line 3—3 of FIG. 2.

It is to be understood that both the foregoing general description and the following detailed description are merely exemplary and explanatory and are not intended to restrict the invention in any way.

Reference will now be made in detail to the present preferred embodiments of the invention, examples of which are illustrated in the accompanying drawings.

Referring first to the embodiment illustrated in FIGS. 1 through 7, the joint, generally 10, is comprised of a driving member, generally 12, and a driven member, generally 14. It is obvious that either member of the joint may be used as the driving member with the other member being the driven member. Preferably, however, member 12 is the driving member, and for convenience and ease of understanding, it will be referred to hereinafter as the driving member and the member 14 will be referred to as the driven member. This designation and description is of course not intended to limit the invention in any way.

Driving member 12 is comprised of a shaft 16 which can be connected at one end by conventional means to means for imparting rotary motion to the shaft. On the other end of shaft 16 is a socket 18. Although socket 18 as shown is integrally formed with the shaft, it of course can be secured to shaft 16 in any other suitable manner, such as by welding.

In accordance with the invention, at least five (5) equally spaced first contact members project from socket 18. As here embodied, these first contact members are comprised of five (5) equally spaced pins 20 projecting radially outwardly from socket 18 in a direction perpendicular to shaft 16. Socket 18 as here embodied is substantially hemispherical in shape. The exact shape of the socket may be varied within the scope of the invention. However, socket 18 should have an internal recess 22 sufficiently large to receive a ball and to permit the ball to rotate freely therein.

In accordance with this invention, pins 20 include bearing means mounted axially on the outer surfaces of pins 20. As here embodied and as may be seen in FIG. 7, the bearing means comprises a Teflon sleeve 19 which is free to rotate with respect to a stud member 21. A cap 23 is secured to the end of stud 21 by a screw 25. Thus cap 23 prevents sleeve 19 from coming off stud 21 but does not interfere with the rotation of sleeve 19 with respect to stud 21.

It of course should be understood that other bearings, such as finger bearings or the like can be substituted for the Teflon sleeves shown in the drawings. As another alternative, the bearings can be stationary with a hard outer surface to provide a race which minimizes friction and wear. Of course, although the bearing members are included in the preferred embodiment of the invention, since they substantially reduce friction, wear and clatter of the joint, they can be omitted without sacrificing the chief advantages achieved by the invention.

In accordance with this invention, means are provided for retaining a ball within the socket while at the same time permitting the ball to rotate freely. As here embodied, this means is comprised of a retaining ring 24 which may be secured to the open face of the socket 18 in any conventional manner as by screws 26.

Driven member 14 is comprised of a shaft 28 connected at one end by conventional means (not shown) to the device to be driven by the power transmitted through the universal joint. A ball 30 is secured to the other end of shaft 28 by conventional means such as by welding, being threaded thereto, or the like.

Ball 30 has a slightly smaller diameter than the internal diameter of recess 22 of socket 18 to permit the ball to revolve within the socket. Retaining ring 24 secures ball 30 in socket 18 and prevents the ball from being withdrawn from the socket.

In accordance with the invention, a plurality or equally spaced second contact members equal in number to said first contact members are mounted on shaft 28. As here embodied the second contact members are comprised of fingers 32 mounted on shaft 28. Fingers 32 may be secured to shaft 28 in any conventional manner, as being welded directly to the shaft. However, in the present preferred embodiment, fingers 32 are secured to a mounting sleeve 34 which is secured to the shaft. Mounting sleeve 34 is held in position on shaft 28 by an abutting collar 36 which is secured to shaft 28 in any conventional manner and a nut 38 which is threaded on shaft 28. The forward end of sleeve 34 abuts collar 36 and in the rear end is held securely in position by the pressure of nut 38. Mounting sleeve 34 is held on shaft 28 against rotation by a key 40 which slides in a keyway 42 in shaft 28.

Referring again to fingers 32, it may be seen that in the illustrated embodiment they have a compound curvature. As the fingers project outwardly away from the mounting sleeve, they curve outwardly to provide clearance between the fingers and socket 18. Then the curve of the fingers flattens to permit the fingers to extend between pins 20 of driving member 12. As pointed out above, the fingers can be either curved or straight, as desired, but are preferably curved.

Figure 10:
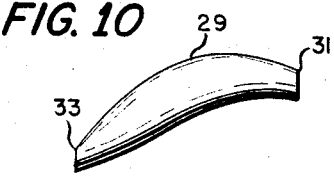
FIG. 10 is a side elevation of a tapered finger which may be used in one embodiment of this invention.

It is also preferred that fingers 32 be tapered as illustrated in FIG. 10 with the finger having its largest cross-sectional area at its midpoint 29 and then tapering to a smaller cross-sectional area at its ends, with the cross-sectional area of forward end 31 being larger than the cross-sectional area of end 33 which is adjacent mounting sleeve 34.

In accordance with this invention, a cover is mounted on the contact members to give the joint added strength and support, to make the joint safe by preventing someone from getting a hand or the like caught in the rotating joint, and to prevent foreign objects from entering the joint and causing it to become fouled. As here embodied, the cover is a substantially bell-shaped member 35 which is secured to fingers 32 and/or mounting sleeve 34 in any conventional manner as by welding.

Referring now to the embodiment illustrated in FIGS. 8 and 9, it may be seen that the joint, generally 50, has a driving member, generally 52, and a driven member, generally 54.

Driving member 52 which is substantially identical to the driving member 12 of the above-described embodiment has a shaft 56 connected, by conventional means, at one end to a source of rotary power and at its other end to a socket 58.

In this embodiment the first contact means are five (5) equally spaced radial pins 60 projecting from the periphery of the socket and perpendicular to shaft 56.

In the present embodiment the means provided on socket 58 for securing a ball within the recess of the socket is comprised of an extension 59 of socket 58. Extension 59 contains a series of slits 61 about its circumference to permit it to be squeezed to a reduced internal diameter after the ball has been inserted into socket 58 and thus prevent the ball from being withdrawn from socket 58.

Driven member 54 is comprised of a shaft 62 connected at one end to a device to be driven by the power transmitted through the universal joint. The other end of shaft 62 is secured to a ball 64.

In the present embodiment the plurality of equally spaced second contact members are comprised of five (5) equally spaced fingers 66. As here embodied, a disc 65 is welded to shaft 62 and fingers 66 are welded near the outer edge of one face of disc 65 and extend parallel to shaft 62. When the joint 50 is colinear (i.e., shaft 56 of driving member 52 has the same axis as shaft 62 of driven member 54) each of fingers 66 extends between two adjacent pins 60.

As in the embodiment illustrated in FIGS. 1 through 6, pins 60 are constructed with bearing members on their outer surfaces. One embodiment of the detail of this construction is illustrated in FIG. 7. The details of this construction were described with respect to the above embodiments of the joint and will not be repeated here.

The operation of the embodiment illustrated in FIGS. 1 through 7 and the embodiment illustrated in FIGS. 8 and 9 is substantially the same.

Referring first to FIGS. 2, 3, and 4, it may be seen that joint 10 has its two shafts aligned or colinear. In this position, each of fingers 32 extends between two adjacent pins 20. That is, finger 32a extends between pins 20a and 20b; finger 32b extends between pins 20b and 20c; finger 32c extends between pins 20c and 20d; finger 32d extends between pins 20d and 20e; finger 32e extends between pins 20e and 20f; and finger 32f extends between pins 20f and 20a.

When the driving member is rotated in the direction indicated by arrow 68 in FIGS. 2 and 4 and arrow 70 in FIG. 3, pins 20 rotate until they engage fingers 32. Since both fingers 32 and pins 20 are equally spaced, each pin will engage a finger at the same instant and as shaft 16 rotates about an axis passing through the center of ball 22, socket 18 carrying pins 20 will rotate until pins 20 engage fingers 32. When fingers 32 are engaged by pins 20, the rotary motion of shaft 16 will be imparted to the fingers 32 and hence to shaft 28. As shaft 28 rotates, it rotates ball 22 about an axis passing through the center of the ball and transmits the rotary motion to the device connected to the end of the shaft. At this point there is no relative movement between the ball and socket since each is rotating at the same rate.

Figure 5:
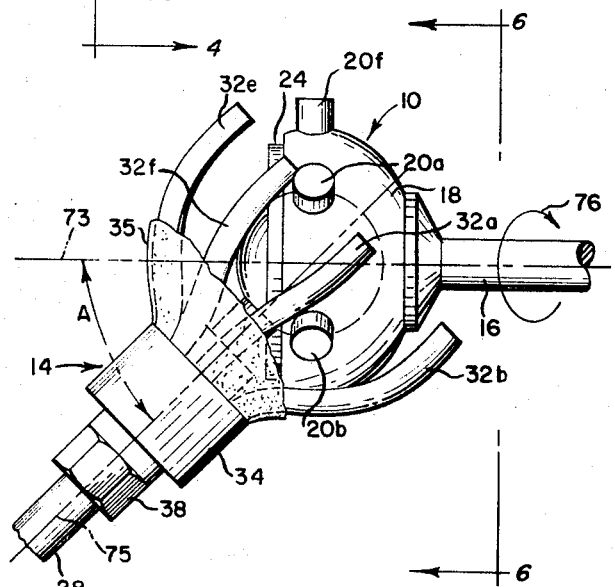
FIG. 5 is a side elevation of the embodiment illustrated in FIGS. 1 through 4, illustrating the joint at a 45° angle.
Figure 6:
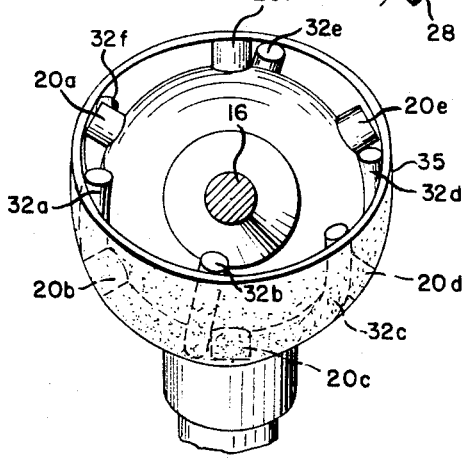
FIG. 6 is an end elevation taken along line 6—6 of FIG. 5.

Referring now to FIGS. 1, 5, and 6, it will be seen that driven member 14 has been pivoted so that shaft 28 is no longer colinear with shaft 16 and is no longer on center line 73 but has a new center line 75 still passing through the center of ball 22. The angle between axis 73 and axis 75 is shown as A.

Prior art joints no longer deliver constant velocity but start to jerk and clatter if angle A is greater than 22°. As angle A increased beyond 22°, the jerking and clattering also increased.

The present invention, however, enables the driven and driving shafts to be pivoted with respect to each other to angles of about 45° without the attendant jerking and clattering common with the prior art joints. Moreover, the joints of this invention continue to deliver constant velocity to the driven shaft at such great and heretofore unattainable angles.

In FIGS. 1, 5, and 6, the angle A between shaft 28 and shaft 16 is shown as 45°. In these figures, the driven shaft is shown as having been pivoted from the colinear position downwardly 45°. It is to be understood, of course, that either or both shafts can be pivoted from the colinear position, and they can be pivoted in any direction.

As driven member 14 pivots downwardly through an arc, fingers 32 slide along Teflon sleeves 19 of pins 20. The curvature of fingers 32 is such that the fingers are always at right angles with their respective pins 20. Thus, as fingers 32 slide along pins 20, the Teflon sleeves are at all times free to rotate.

As may be best seen in FIGS. 5 and 6, the upper fingers of driven member 14 move out of contact with their respective pins as the driven member moves downwardly to form a larger angle with the driving member. However, the lower fingers remain in contact with their respective pins. It is preferred that the fingers be tapered as illustrated in FIG. 10. The tapered shape of fingers 32 insures that at least two (2) of the lower fingers are always in contact with their respective pins, even when the joint is operating at large angles, since the pins normally follow a path corresponding to the taper of the fingers and, by having the fingers tapered to conform to this path, the contact between the pin and the finger is insured. In actual operation, both the driving and driven members will be rotating and the specific fingers and pins which are in contact with each other will be changing. However, the construction of the joint permits this change of contact to take place smoothly without jerking or clattering.

As may be best seen in FIG. 5, shaft 28 engages the inner edge of retainer ring 24 when the angle is about 45° to prevent this embodiment of the joint from being pivoted more than 45°. A beveled edge is preferably provided on retainer ring 24 to reduce the wear between shaft 28 and ring 24.

Referring now to the embodiment illustrated in FIGS. 8 and 9, it may be seen that the driving member 52 has been pivoted with respect to the driven member 54. An axis 84 passing through the center of shaft 56 and ball 64 makes an angle B with an axis 86 passing through shaft 62 and ball 64. In this embodiment, angle B is also illustrated as being 45°.

When joint 54 is in the colinear position, one of fingers 66 extends between each pair of adjacent pins 60. Thus, finger 66a extends between pins 60a and 60b. Finger 66b extends between pins 60b and 60c. Finger 66c extends between pins 60b and 60c. Finger 66c extends between pins 60c and 60d. Finger 66d extends between pins 60d and 60e, and finger 66e extends between pins 60e and 60a. When the driven member 52 is rotated in the direction indicated by arrow 80 in FIG. 8, and arrow 82 in FIG. 9, and the shafts of the driving and driven members are colinear, pin 60a will engage finger 66a, pin 60b will engage finger 66b, pin 60c will engage finger 66c, pin 60d will engage finger 66d and pin 60e will engage finger 66e, thus imparting rotary motion to driven member 54.

Here again, as the joint pivots to its under angles, the upper pins move out of contact with the upper fingers but the lower pins remain in contact with the lower fingers.

In this embodiment there are only five (5) fingers 66 and five (5) pins 60. It has been found that a minimum of five (5) fingers and five (5) pins are required to produce a satisfactory joint which will provide smoother operation and will not jerk or clatter at angles up to 45°. Fewer numbers of pins and fingers provide too large a gap to permit smooth transition of driving force from one pin to the next. As more than five (5) fingers and five (5) pins are used, the transmission of power through the joint becomes even smoother. The only upper limit on the number of pins and fingers which can be used is that there must be sufficient space between the pins to permit the fingers to move freely as they pivot. It will be appreciated that this spacing will vary with the size of the joint.

From the foregoing description, it is apparent that the present invention provides a new and improved universal joint which can transmit rotary motion of a relatively constant velocity without jerking or clattering at angles up to about 45°.

The invention, in its broader aspects, is not limited to the specific mechanism shown and described but also includes, within the scope of the accompanying claims, any departures made from such mechanisms that do not depart from the principles of the invention and that do not sacrifice its chief advantages.

What is claimed is:

1. A universal joint comprising:
 a first shaft;
 a socket secured to one end of said first shaft;
 at least five equally spaced first contact members extending outwardly from said socket;
 a second shaft;
 a ball secured to one end of said second shaft and mounted in said socket;
 means for retaining said ball within said socket; and
 a plurality of equally spaced curved contact members, equal in number to said first contact members, mounted on said second shaft with one of said curved contact members extending between each pair of adjacent first contact members when said first and second shafts are colinear;
 said first and said second shafts being free to pivot with respect to each other in any direction from a colinear position.

2. The joint of claim 1 wherein said first contact members project radially from said socket and said first contact members are perpendicular to said first shaft.

3. The joint of claim 1 wherein said first and said second shafts are free to pivot with respect to each other at least 45°.

4. The joint of claim 3 wherein each of said first contact members include bearing means mounted axially on the outer surface of said first contact member whereby said bearing means can rotate relative to the remainder of said first contact member when said first contact member engaged a curved contact member.

5. The joint of claim 4, wherein said bearing means is a Teflon sleeve.

6. The joint of claim 1 wherein a mounting member is secured to said second shaft and said curved contact members are mounted on said mounting member.

7. The joint of claim 6 wherein said curved contact members are curved fingers.

8. The joint of claim 7 wherein said curved fingers are tapered with the cross-sectional area of their ends being less than the cross-sectional area of their midpoints.

9. The joint of claim 7 wherein a cover member is mounted on the outer edges of said curved fingers.

10. A constant velocity universal joint comprising:
a first shaft;
a socket secured to one end of said first shaft;
at least five equally spaced first contact members extending radially outwardly from said socket with said first contact members being perpendicular to said first shaft;
a second shaft;
a ball secured to one end of said second shaft and mounted in said socket;
said socket including means for retaining said ball within said socket;
a plurality of equally spaced curved contact members, equal in number to said first contact members, mounted on said second shaft with one of said curved contact members extending between each pair of adjacent first contact members when said first and said second shafts are colinear and said curved contact members being spaced from said socket; and
said first and said second shafts being free to pivot with respect to each other in any direction from a colinear position.

11. The joint of claim 10 wherein the curvature of said curved contact members is such that as said first contact members and said curved contact members are pivoted with respect to each other, said first contact members will always be at substantially a right angle with said curved contact members at the point of contact.

12. A constant velocity universal joint comprising:
a first shaft;
a socket secured to one end of said first shaft;
at least five equally spaced pins extending radially outwardly from said socket with said pins being perpendicular to said first shaft;
a second shaft;
a ball mounted concentrically in said socket and secured to one end of said second shaft;
said socket including means for retaining said ball within said socket;
a plurality of equally spaced curved fingers equal in number to said pins mounted on said second shaft with one of said fingers extending between each pair of adjacent pins, when said first and said second shafts are colinear and said fingers being spaced from said socket; and
said first and said second shafts being free to pivot with respect to each other at least 45° in any direction from a colinear position.

13. The joint of claim 12 wherein the curvature of said curved fingers is such that as said pins and said fingers are pivoted with respect to each other, said pins will always be at substantially a right angle with said fingers at the point of contact.

14. The joint of claim 13 wherein said curved fingers are tapered with the cross-sectional area of their ends being less than the cross-sectional area of their midpoints.

15. The joint of claim 14 wherein a cover member is mounted on the outer edges of said curved fingers.

References Cited
UNITED STATES PATENTS

| | | | |
|---|---|---|---|
| 477,625 | 6/1892 | Detrick | 64—9 |
| 1,262,561 | 4/1918 | Ream | 64—7 |
| 1,276,953 | 8/1918 | Parker | 64—6 |
| 1,322,341 | 11/1919 | Ream | 64—7 |
| 2,617,277 | 11/1952 | Sindelar | 64—21 |
| 3,054,275 | 9/1962 | Ongaro | 64—9 |
| 3,087,314 | 4/1963 | Jarvis et al. | 64—17 |
| 3,125,870 | 3/1964 | Orain | 64—21 X |

HALL C. COE, *Primary Examiner.*